United States Patent Office 3,331,881
Patented July 18, 1967

3,331,881
SEPARATION PROCESS
William G. Nixon, Westchester, and Joseph R. Marcus, Skokie, Ill., assignors to Universal Oil Products Company, Des Plaines, Ill., a corporation of Illinois
No Drawing. Filed Apr. 22, 1964, Ser. No. 361,884
14 Claims. (Cl. 260—674)

This invention relates to a process for the separation of the reaction products of water, boron halide and a boron halide-modified substantially anhydrous inorganic oxide from a fluid organic compound containing the same, and more particularly relates to a process for separating the reaction products of water, boron halide, and a boron halide-modified substantially anhydrous inorganic oxide from a fluid hydrocarbon containing the same by contacting said reaction products and fluid hydrocarbon with a selective sorbent comprising an oxide of sulfur chemically combined with a refractory oxide support. Still more particularly, this invention relates to a process for separating the reaction products of water, boron halide, and a boron halide-modified substantially anhydrous inorganic oxide from a fluid hydrocarbon containing the same, said products including hydrates of boron oxides and coordination compounds comprising boron, hydrogen, oxygen and fluorine by contacting said reaction products and fluid hydrocarbon with a selective sorbent comprising an oxide of sulfur chemically combined with a refractory oxide support.

In modern day petroleum and petrochemical complexes, it is often very difficult to maintain the process vessels and process lines in a substantially anhydrous condition especially in periods of initial start-up of the unit and during periods when various units of these complexes are shutdown for maintenance and repair. The necessity for maintaining these process vessels and process lines in a substantially anhydrous condition becomes apparent in, for example, processes to produce alkylatable aromatic hydrocarbons utilizing a boron halide-modified substantially anhydrous inorganic oxide, alkylatable aromatic hydrocarbon, olefin-acting componnd and boron halide. In a specific example, when utilizing a boron trifluoride-modified substantially inorganic oxide, alkylatable aromatic hydrocarbon, olefin-acting compound and boron trifluoride, trace quantities of water sometimes are encountered in process streams per se or as coordination compounds of boron trifluoride and/or hydrogen fluoride. The term "trace quantities of water" by way of definition means that quantity of water having a concentration of less than about 0.10 weight percent of said process stream. When these coordination compounds occur, it is often difficult to maintain such an alkylation process in its most efficient running condition due to the accumulation of these compounds. Continued formation of these compounds have caused the complete shutdown of an alkylation process.

It is therefore the principal object of our invention to provide an improved process for the efficient and economical separation of the reaction products of water, boron halide and a boron halide-modified substantially anhydrous inorganic oxide contained in such process streams before such reaction products reach such a level that shutdown of the process is necessitated. It is a further object of this invention to provide a process whereby the fluid organic compound in such a process stream may be purified continuously without appreciable consumption and loss of the fluid organic compound so that the continuous efficient production of alkylatable aromatic compound can be maintained for long periods of time. It is a further object of this invention to provide a relatively inexpensive selective sorbent for the purposes outlined above so as to achieve economy of operation in that the purified fluid organic compound may be returned to the process by means of the selective removal of the reaction products and the sorbent may be regenerated for reuse as set forth hereinafter. Other objects of this invention will be set forth hereinafter as part of the specification and in the accompanying examples.

In one embodiment, the present invention relates to a process for separating the reaction products of water, boron halide and a boron halide-modified substantially anhydrous inorganic oxide from a fluid organic compound containing the same, said products including hydrates of boron oxides and coordination compounds comprising boron, hydrogen, oxygen and fluorine, which comprises contacting said reaction products and fluid organic compound with a selective sorbent comprising an oxide of sulfur chemically combined with a refractory oxide support, selectively removing said reaction products with said sorbent, recovering purified organic compound from said process, subsequently regenerating said sorbent at regeneration conditions, and reusing the regenerated sorbent in the first step as aforesaid.

Another embodiment of the present invention relates to a process for separating the reaction products of water, boron halide, and a boron halide-modified substantially anhydrous inorganic oxide from a fluid hydrocarbon containing the same, said products including hydrates of boron oxides and coordination compounds comprising boron, hydrogen, oxygen and fluorine, which comprises contacting said reaction products and fluid hydrocarbon with a selective sorbent comprising an oxide of sulfur chemically combined with a refractory oxide support, selectively removing said reaction products with said sorbent, recovering purified fluid hydrocarbon from said process, subsequently regenerating the sorbent at regeneration conditions, and reusing the regenerated sorbent in the first step as aforesaid.

A further embodiment of the present invention relates to a process for separating the reaction products of water, boron halide, and a boron halide-modified substantially anhydrous inorganic oxide from a liquid hydrocarbon containing the same, said products including hydrates of boron oxides and coordination compounds comprising boron, hydrogen, oxygen and fluorine, which comprises contacting said reaction products and liquid hydrocarbon with a selective sorbent comprising an oxide of sulfur chemically combined with a refractory oxide support, selectively removing said reaction products with said sorbent, recovering purified liquid hydrocarbon from said process, subsequently regenerating said sorbent at regeneration conditions, and re-using the regenerated sorbent in the first step as aforesaid.

A specific embodiment of the present invention relates to a process for separating the reaction products of water, boron trifluoride, and a boron trifluoride-modified substantially anhydrous inorganic oxide from a liquid aromatic hydrocarbon containing the same, said products including hydrates of boron oxides and coordination compounds comprising boron, hydrogen, oxygen and fluorine, which comprises contacting at a temperature of from about 0° to about 300° C. and at a pressure of from about atmospheric to about 200 atmospheres said reaction products and liquid aromatic hydrocarbon with a selective sorbent comprising an oxide of sulfur chemically combined with a refractory oxide support, selectively removing said reaction products with said sorbent, recovering purified liquid aromatic hydrocarbon from said process, subsequently regenerating said sorbent at regeneration conditions including heat treating at a temperature in the range of from about 300° to about 700° C., and reusing the regenerated sorbent in the first step as aforesaid.

Other embodiments of the present invention will become apparent in considering the specification as hereinafter set forth.

As set forth hereinabove, the present invention relates to a separation process for separating the reaction products of water, boron halide, and a boron halide-modified substantially anhydrous inorganic oxide from a process stream utilizing a selective sorbent comprising an oxide of sulfur chemically combined with a refractory support. These reaction products of water, boron halide, and boron halide-modified substantially anhydrous inorganic oxide have been encountered as oxides of boron, such as boron trioxide, etc., and as the hydrates of boron oxides such as ortho boric acid, tetra boric acid, meta boric acid, etc. In addition to the hereinabove mentioned reaction products, coordination compounds comprising boron, hydrogen, oxygen and fluorine sometimes are encountered and are present as reaction products as aforesaid.

As hereinbefore set forth, the invention is concerned with a separation process for separating the reaction product of water, boron halide and a boron halide-modified substantially anhydrous inorganic oxide from a fluid organic compound containing the same, said process being effected in the presence of a selective sorbent which possesses a selectivity towards these reaction products. The selective sorbent comprises an oxide of sulfur composited on and chemically bonded to a refractory oxide support. The particular refractory oxide support may comprise a high surface area solid support although it is one of the features of the selective sorbent of the present invention that low surface area supports such as alpha-alumina are satisfactory for the preparation of selective sorbents for use in the process of this invention.

As set forth hereinabove, a support may comprise a high surface area support. By the term "high surface area" is meant a surface area measured by surface adsorption techniques within the range of from about 25 to about 500 or more square meters per gram and preferably a support having a surface area of approximately 100 to 300 square meters per gram. However, as set forth hereinabove, alpha-alumina, which is usually characterized by a surface area ranging from about 10 to about 25 square meters per gram is also a satisfactory support. Therefore, satisfactory supports for the preparation of selective sorbents for use in the process of this invention include high surface area crystalline alumina modifications such as gamma-, eta- and theta-alumina and low surface area supports such as alpha-alumina, although these are not necessarily of equivalent suitability.

In addition to the aforementioned alpha-, gamma-, eta- and theta-aluminas which may be utilized as solid supports, it is also contemplated that other refractory oxides such as zirconia, magnesia, thoria, etc., and combinations of refractory oxides such as silica-alumina, silica-magnesia, alumina-silica-magneisa, alumina-thoria, alumina-zirconia, etc., may also be utilized as refractory oxide supports for the selective sorbent of the present invention.

Oxides of sulfur which may be chemically bound to the refractory oxide support include sulfur trioxide and metallic oxides of sulfur in which the metallic portion of the compound comprises a metal of Group VI-B of the Periodic Table, a metal of the Iron Group of Group VIII as well as aluminum, etc., such as aluminum sulfate, nickel sulfate, nickel sulfite, chromium sulfate, chromium sulfite, molybdenum sulfate, tungsten sulfate, cobalt sulfate, cobaltous sulfite, ferric sulfate, ferric sulfite, etc. In addition to the hereinabove enumerated metallic oxides of sulfur it is also contemplated within the scope of this invention that the refractory oxide support may be impregnated with a solution of ammonium sulfate or ammonium sulfite, or, is so desired, with a solution of sulfuric or sulfurous acid adjusted to a pH of 9.0 by the addition of a sufficient amount of ammonium hydroxide. Following the impregnation, the support is then heat treated thereby driving off the ammonia and allowing the oxide of sulfur to remain impregnated on and chemically bonded to the refractory oxide support.

In addition to the aforesaid oxides of sulfur, the refractory oxide support may also be impregnated with concentrated sulfuric or sulfurous acid in an amount sufficient so that the final selective sorbent possesses from about 1 to about 15% by weight of sulfate or sulfite content.

The chemical addition of the oxide of sulfur to the refractory oxide support will enhance the surface area characteristics of the composite inasmuch as the finished selective sorbent exhibits greater surface area than the refractory oxide originally possessed. Further, the selective sorbent obtained by the preparation described hereinabove is substantially anhydrous due to the chemical combination of the oxide of sulfur with the hydroxyl groups of the refractory oxide support. Thus, it is another feature of the present invention that a substantially anhydrous support initially is not necessary to prepare the selective sorbent of the present invention.

As hereinbefore set forth, certain forms of alumina may be utilized as the refractory oxide support for the selective sorbent of this invention. The base alumina may be prepared by any of the well known suitable means of manufacture, one example of which is the addition of an alkaline reagent to a salt of aluminum in an amount sufficient to form aluminum hydroxide, which, upon drying and calcining, is converted to alumina. Similarly, if the refractory oxide support comprises both alumina and silica, these components may be prepared by separate, successive or coprecipitate means.

For example, a refractory oxide support previously prepared by the methods hereinbefore set forth is then combined with an oxide of sulfur by conventional means such as treating the support with a solution of said oxide of sulfur, said oxide of sulfur being added in an amount sufficient to allow the finished sorbent to contain from about 1.0 to about 15% or more by weight of sulfate or sulfite. Following this, the combined material is then heat treated in a furnace tube or muffle furnace etc. The finished selective sorbent comprising the oxide of sulfur chemically combined with the refractory oxide support is then utilized as the selective sorbent.

Many fluid organic compounds can be utilized in the process of the present invention. Suitable fluid organic compounds include hydrocarbons such as the paraffins, cycloparaffins, aromatics, etc. Suitable paraffins are normal butane, isobutane, normal pentane, isopentane, neopentane, normal hexane, etc. Suitable cycloparaffins are cyclopentane, methylcyclopentane, cyclohexane, methylcyclohexane, cycloheptane, cyclooctane, etc. Suitable aromatic hydrocarbons include benzene, toluene, orthoxylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, diethylbenzenes, triethylbenzenes, normal propylbenzene, isopropylbenzene, etc. Preferred hydrocarbons are monocyclic aromatic hydrocarbons, that is, benzene hydrocarbons. High molecular weight alkyl aromatic hydrocarbons are also suitable. These include those aromatic hydrocarbons such as are produced by the alkylation of aromatic hydrocarbons with olefin polymers which are used as intermediates in the preparation of sulfonate surface-active agents. Such products are frequently referred to in the art as detergent alkylates, and include hexylbenzenes, nonylbenzenes, dodecylbenzenes, tridecylbenzenes, pentadecylbenzenes, hexyltoluenes, nonyltoluenes, dodecyltoluenes, pentadecyltoluenes, etc. Very often alkylate is obtained as a high boiling fraction in which the alkyl group attached to the aromatic nucleus varies in size from about $C_9$ to $C_{18}$. Other suitable aromatic hydrocarbons, which at specified removal conditions, depending upon the melting point of the aromatic chosen, would be in liquid form, would include those aromatic hydrocarbons with two or more aryl groups such as diphenyl, diphenylmethane, triphenyl, triphenylmethane, stilbene, etc. Examples of other aromatic hydrocarbons within the scope of this invention which at specified reaction conditions, depending upon melting point of the aromatic chosen, would be in liquid form, include those containing condensed aromatic rings. These include naphthalene, alkylnaphthalenes, fluorene, anthracene, phenanthrene, naphthacene, rubrene, etc. Of the abovementioned aromatic hydrocarbons that could be utilized in the process of this invention, the benzene hydrocarbons are preferred, and of the preferred benzene hydrocarbons, benzene itself is particularly preferred.

The process of this invention utilizing the selective sorbent hereinbefore set forth may be effected in any suitable manner and may comprise either a batch or a continuous type operation. The preferred method by which the process of this invention may be effected is a continuous type operation. One particular method is the fixed bed operation in which the fluid organic compound containing the reaction products of water, boron halide and a boron halide-modified substantially anhydrous inorganic oxide is continuously charged to a reaction zone containing a fixed bed of the selective sorbent, said reaction zone being maintained at the proper operating conditions of temperature and pressure, that is, a temperature in the range of from about 0° to about 300° C. and a pressure including a pressure of from about atmospheric to about 200 atmospheres, although the exact temperature and pressure needed will depend upon the particular fluid organic compound to be purified, the particular selective sorbent utilized, and the time of contact. The liquid hourly space velocity (the volume of charge per volume of selective sorbent per hour) is maintained in the reaction zone in the range of from about 0.1 to about 20 or more, and preferably in a range of from about 0.1 to about 10, or at a gaseous hourly space velocity in a range of from about 100 to about 1500 or more. The fluid organic compound containing said reaction products passes through the reaction zone in either an upward or downward flow and these reaction products are selectively removed from the fluid organic compound and purified organic compound is continuously withdrawn, recovered and reused. It is also contemplated within the scope of this invention that the selective sorbent may be utilized in the form of granules, grains, powders, particles, spheres, balls, tubular shapes, etc. Details of processes of this general character are familiar to those skilled in the art and any necessary additions or modifications of the above general procedure will be more or less obvious and can be made without departing from the broad scope of this invention.

Another continuous type operation comprises the moving bed type in which the fluid organic compound containing the hereinbefore described reaction products and the selective sorbent move either concurrently or countercurrently to each other while passing through said reaction zone.

Still another type of operation which may be used is the batch type operation in which a quantity of the fluid organic compound containing said reaction products is placed in an appropriate apparatus such as an autoclave. The apparatus is then heated to the desired temperature and maintained thereat for a predetermined residence time at the end of which time the autoclave and contents thereof are cooled to room temperature and purified organic compound is recovered by conventional means.

The selective sorbent of the present invention may be regenerated periodically for reuse by heat treating the reaction product-containing selective sorbent at regeneration conditions including a temperature in the range of from about 300° C. to about 700° C. while passing a gas such as air, or an inert gas such as nitrogen, argon, etc., or a gas such as sulfur trioxide through the regeneration zone whereby the reaction products are evolved and withdrawn and the selective sorbent regenerated for reuse.

The process of the present invention is illustrated by the following examples which are introduced for the purpose of illustration only and with no intention of unduly limiting the generally broad scope of the invention.

*Example I*

This example illustrates the effect of the presence of trace quantities of water in process streams during the production of alkylated aromatics. The processing unit consisted of liquid and gas charge pumps, reactors, high pressure gas separators, pressure controllers, boron trifluoride treating system, feed pretreating system, fractionating columns, and liquid and gas collection systems. The catalyst charged into the reactor comprised a boron trifluoride-modified substantially anhydrous inorganic oxide, namely boron trifluoride-modified gamma-alumina. The unit was started up according to standard procedures so that ethylbenzene was produced. Substantially pure boron trifluoride was charged to the unit in sufficient quantity along with substantially anhydrous benzene and ethylene so that the benzene was converted to ethylbenzene. Additional boron trifluoride was added as needed to maintain good conversion. Operating temperatures were held at a minimum consistent with good conversion. The operating pressure was selected so that the benzene was kept substantially in the liquid phase. The aromatic to olefin ratio was kept at a maximum at all times consistent with the equipment limitations, in order that few polyethylbenzenes should form. The fractionation section first separated part of the benzene recycle by flash and then the remainder by fractionation. The maximum recycle possible was flashed because of the lower heat requirement for flashing until the ethylbenzene and heavier products present became a contamination factor. Most of the boron trifluoride present was in the effluent vapors. Part of this boron trifluoride was condensed with the benzene recycle and returned to the reactor. The remaining boron trifluoride passed into the boron trifluoride treating system where it was absorbed and returned to the reactor by compressor after being stripped from the absorbent. The liquid from the hot flash was sent to the benzene fractionating column where after removal of the remaining recycle benzene in the benzene column, the ethylbenzene and heavier products were fractionated into an ethylbenzene cut in the overhead of the ethylbenzene column, and a bottom cut. The overhead was sent to storage. The fractionator bottoms were recycled back to a second reactor where the polyethylbenzene were transalkylated in the presence of benzene to produce ethylbenzene.

During the production of ethylbenzene in the hereinabove outlined process flow scheme, it was observed that trace quantities of water were encountered in the process streams per se and as coordination compounds of the boron trifluoride and/or hydrogen fluoride depending upon the amount of water present. The over-all efficiency of the alkylation process decreased as the concentration of these compounds became higher. The continued formation of these compounds caused the eventual shutdown of the plant.

*Example II*

This example illustrates the substantial separation and removal from a recycle benzene stream of the reaction products of water, boron trifluoride, and a boron trifluoride-modified substantially anhydrous alumina during the production of alkylated aromatics. The same processing unit described in Example I is also utilized for the experiment described in this example.

The process flow scheme is modified so that two identical sorption zones in parallel containing alpha-alumina chemically combined with sulfur trioxide are introduced into the recycle benzene stream that had previously contained reaction products. Chemical analyses of the benzene before the sorption zones indicate the presence of reaction products including hydrates of boron oxides and coordination compounds comprising boron, hydrogen, oxygen and fluorine. One of the sorption zones is placed in service in the process flow and maintained at a temperature of about 150° C. and a pressure of about 30 atmospheres. Chemical analyses of the benzene after this sorption zone in service indicates substantial separation and removal of these reaction products had occurred. Purified benzene is returned to the process. When the first sorption zone is saturated with the reaction products, the second sorption zone is cut into service and the first sorption zone blocked out of the process flow scheme. The contents of the first sorption zone is regenerated in place by heat treating with air while the second sorption zone is being utilized. The regeneration is practiced when analyses of the sorption zone effluent show an increase in concentration of the reaction products in the sorption zone effluent. The sorbent is regenerated for reuse by heat treating with air at a temperature of about 500° C. for about two hours. The regenerated sorbent is subsequently returned to service and the second sorption zone is regenerated in the same manner as the first sorption zone.

The overall efficiency of the alkylation process is maintained at the desired level with the sorption zones containing the alpha-alumina chemically combined with the sulfur trioxide in place as evidenced by the continuous production of ethylbenzene until the plant was shutdown at the completion of the run.

*Example III*

This example illustrates the substantial separation and removal from a recycle benzene stream of the reaction products of water, boron trifluoride, and a boron trifluoride-modified substantially anhydrous alumina during the production of alkylated aromatics. The same processing unit described in Example I is also utilized for the experiment described in this example.

The process flow scheme is again modified so that two identical sorption zones in parallel containing gamma-alumina chemically combined with an oxide of sulfur derived from a 20% solution of aluminum sulfate are introduced into the recycle benzene stream that had previously contained reaction products. Chemical analyses of the benzene before the sorption zone in service indicates the presence of reaction products including hydrates of boron oxides and coordination compounds comprising boron, hydrogen, oxygen and fluoride. Chemical analyses of the benzene after the sorption zone, which is maintained at a temperature of about 175° C. and a pressure of about 30 atmospheres, indicates substantial separation and removal had occurred. Purified benzene is returned to the process. Once again, when the first sorption zone is saturated with the reaction products, the sorbent is regenerated for reuse by heat treating with nitrogen at a temperature of about 500° C. for about two hours. The regenerated sorbent is subsequently returned to service and the second sorption zone contents are then regenerated in the same manner.

The alkylation process is maintained at the desired level of production with the sorption zones containing the gamma-alumina chemically combined with an oxide of sulfur derived from aluminum sulfate as evidenced by the continuous production of ethylbenzene until the plant was shutdown at the completion of the run.

*Example IV*

This example illustrates the substantial separation and removal from a recycle benzene stream of the reaction products of water, boron trifluoride, and a boron trifluoride-modified substantially anhydrous alumina during the production of alkylated aromatics. The same processing unit described in Example I is also utilized for the experiment in this example.

The process flow scheme is modified so that two identical sorption zones containing silica-alumina chemically combined with an oxide of sulfur derived from concentrated sulfuric acid is introduced into a recycle benzene stream that had previously contained reaction products including hydrates of boron oxides and coordination compounds comprising boron, hydrogen, oxygen and fluorine. Chemical analyses of the benzene before the sorption zone again indicates the presence of these coordination compounds. Chemical analyses of the benzene after the sorption zone in service indicates that the benzene was substantially purified. The sorbent is regenerated for reuse periodically by heat treating at a temperature of about 500° C. with sulfur trioxide for about two hours. The regenerated sorbent is subsequently returned to service.

We claim as our invention:

1. A process for separating the reaction products of water, boron halide and a boron halide-modified substantially anhydrous inorganic oxide from a fluid organic compound containing the same, said products including hydrates of boron oxides and coordination compounds comprising boron, hydrogen, oxygen and fluorine, which comprises contacting said reaction products and fluid organic compound with a solid sorbent comprising an oxide of sulfur chemically combined with a refractory oxide support, said sorbent being selective for the sorption of said reaction products, selectively removing said reaction products with said sorbent, recovering purified organic compound from said process, subsequently regenerating said sorbent at regeneration conditions, and reusing the regenerated sorbent in the first step as aforesaid.

2. A process for separating the reaction products of water, boron halide, and a boron halide-modified substantially anhydrous inorganic oxide from a fluid hydrocarbon containing the same, said products including hydrates of boron oxides and coordination compounds comprising boron, hydrogen, oxygen and fluorine, which comprises contacting said reaction products and fluid hydrocarbon with a solid sorbent comprising an oxide of sulfur chemically combined with a refractory oxide support, said sorbent being selective for the sorption of said reaction products, selectively removing said reaction products with said sorbent, recovering purified fluid hydrocarbon from said process, subsequently regenerating said sorbent at regeneration conditions, and reusing the regenerated sorbent in the first step as aforesaid.

3. A process for separating the reaction products of water, boron halide, and a boron halide-modified substantially anhydrous inorganic oxide from a liquid hydrocarbon containing the same, said products including hydrates of boron oxides and coordination compounds comprising boron, hydrogen, oxygen and fluorine, which comprises contacting said reaction products and liquid hydrocarbon with a solid sorbent comprising an oxide of sulfur chemically combined with a refractory oxide suport, said sorbent being selective for the sorption of said reaction products, selectively removing said reaction products with said sorbent, recovering purified liquid hydrocarbon from said process, subsequently regenerating said sorbent at regeneration conditions, and reusing the regenerated sorbent in the first step as aforesaid.

4. A process for separating the reaction products of water, boron halide, and a boron halide-modified substantially anhydrous inorganic oxide from a liquid hydrocarbon containing the same, said products including hydrates of boron oxides and coordination compounds comprising boron, hydrogen, oxygen and fluorine, which comprises contacting said reaction products and liquid hydrocarbon with a solid sorbent comprising an oxide of sulfur chemically combined with an alpha-alumina support, said sorbent being selective for the sorption of said reaction products, selectively removing said reaction products with said sorbent, recovering purified liquid hydrocarbon from said process, subsequently regenerating said sorbent at regeneration conditions, and reusing the regenerated sorbent in the first step as aforesaid.

5. A process for separating the reaction products of water, boron halide, and a boron halide-modified substantially anhydrous inorganic oxide from a liquid hydrocarbon containing the same, said products including hydrates of boron oxides and coordination compounds comprising boron, hydrogen, oxygen and fluorine, which comprises contacting said reaction products and liquid hydrocarbon with a solid sorbent comprising an oxide of sulfur chemically combined with a gamma-alumina support, said sorbent being selective for the sorption of said reaction products, selectively removing said reaction products with said sorbent, recovering purified liquid hydrocarbon from said process, subsequently regenerating said sorbent at regeneration conditions, and reusing the regenerated sorbent in the first step as aforesaid.

6. The process of claim 1 further characterized in that said boron halide is boron trifluoride.

7. The process of claim 1 further characterized in that said contacting is effected at a temperature of from about 0° to about 300° C. and at a pressure of from about atmospheric to about 200 atmospheres.

8. The process of claim 1 further characterized in that said regeneration conditions include heat treating at a temperature in the range of from about 300° C. to about 700° C.

9. The process of claim 3 further characterized in that said boron halide is boron trifluoride.

10. The process of claim 3 further characterized in that said contacting is effected at a temperature of from about 0° to about 300° C. and at a pressure of from about atmospheric to about 200 atmospheres.

11. The process of claim 3 further characterized in that said liquid hydrocarbon is a liquid aromatic hydrocarbon.

12. The process of claim 3 further characterized in that said liquid hydrocarbon is a liquid benzene hydrocarbon.

13. The process of claim 3 further characterized in that said liquid hydrocarbon is liquid benzene.

14. The process of claim 3 further characterized in that said regeneration conditions include heat treating at a temperature in the range of from about 300° C. to about 700° C.

References Cited

UNITED STATES PATENTS

| 2,613,232 | 10/1952 | Janoski | 260—676 |
| 2,762,852 | 9/1956 | Litton | 208—310 |
| 3,238,268 | 1/1966 | Fenske | 260—671 |

FOREIGN PATENTS 416,711   9/1934   Great Britain.

DELBERT E. GANTZ, *Primary Examiner.*

C. E. SPRESSER, Jr., *Assistant Examiner.*